United States Patent
Pohjola

(10) Patent No.: US 12,422,052 B2
(45) Date of Patent: Sep. 23, 2025

(54) FLUID FLOW THROTTLE VALVE

(71) Applicant: Solar Water Solutions OY, Espoo (FI)

(72) Inventor: Heikki Pohjola, Espoo (FI)

(73) Assignee: SOLAR WATER SOLUTIONS OY, Espoo (FI)

( * ) Notice: Subject to any disclaimer, the term of this patent is extended or adjusted under 35 U.S.C. 154(b) by 0 days.

(21) Appl. No.: 18/286,892

(22) PCT Filed: Mar. 29, 2022

(86) PCT No.: PCT/FI2022/050203
§ 371 (c)(1),
(2) Date: Oct. 13, 2023

(87) PCT Pub. No.: WO2022/219231
PCT Pub. Date: Oct. 20, 2022

(65) Prior Publication Data
US 2024/0192709 A1    Jun. 13, 2024

(30) Foreign Application Priority Data
Apr. 13, 2021  (FI) .................................. 20215438

(51) Int. Cl.
*G05D 16/10* (2006.01)
*B01D 61/10* (2006.01)
(Continued)

(52) U.S. Cl.
CPC ............ *F16K 15/063* (2013.01); *B01D 61/10* (2013.01); *F16K 15/026* (2013.01); *F16K 21/02* (2013.01);
(Continued)

(58) Field of Classification Search
CPC ...... F16K 15/063; F16K 15/026; F16K 21/02; B01D 61/10; B01D 2313/18;
(Continued)

(56) References Cited

U.S. PATENT DOCUMENTS 374,750 A * 12/1887 Orme ................... F16K 17/0433
137/542
705,704 A * 7/1902 Potvliet ................... F16K 15/16
137/512.2
(Continued)

FOREIGN PATENT DOCUMENTS

| EP | 2660469 A1 | 11/2013 |
|---|---|---|
| WO | 2019008223 A1 | 1/2019 |
| WO | 2020193844 A1 | 10/2020 |

*Primary Examiner* — William M McCalister
(74) *Attorney, Agent, or Firm* — Boone IP Law, PLLC

(57) ABSTRACT

A fluid flow throttle valve that keeps the pressure of a fluid flow pumped into a system by a high-pressure pump constant and that is particularly suitable as a reject valve for maintaining the system pressure of a reverse osmosis device at a pressure level of <20 bar. The flow pressure is regulated by a spring-actuated cone that is partially within the outflow channel of the throttle valve at any given time. A motion restrictor is supported to the wider end of the cone such that in its lowest position, the cone permits a bypass flow of a predetermined volume up to the target pressure of the system. As the flow volume increases further and the cone rises as a result, the force exerted on the restrictor member by the flow pressure contributes to preventing the valve from closing.

3 Claims, 2 Drawing Sheets

(51) Int. Cl.
*F16K 15/02* (2006.01)
*F16K 15/06* (2006.01)
*F16K 21/02* (2006.01)

(52) U.S. Cl.
CPC ..... *B01D 2313/18* (2013.01); *Y10T 137/7932* (2015.04); *Y10T 137/7934* (2015.04)

(58) Field of Classification Search
CPC ......... Y10T 137/7932; Y10T 137/7934; Y10T 137/7863; Y10T 137/7916
USPC .......... 137/542, 543, 516.19, 533.23; 251/92
See application file for complete search history.

(56) References Cited

U.S. PATENT DOCUMENTS

| | | | | |
|---|---|---|---|---|
| 978,729 A * | 12/1910 | Garber | ................... | F16K 15/02 251/114 |
| 2,517,858 A * | 8/1950 | Farris | ................... | F16K 17/082 251/86 |
| 2,960,998 A * | 11/1960 | Sinker | ................. | F16K 15/026 137/542 |
| 3,756,273 A * | 9/1973 | Hengesbach | ......... | F16K 15/063 137/543.13 |
| 3,918,481 A | 11/1975 | Doe et al. | | |
| 4,273,153 A * | 6/1981 | Brown | .................... | F16K 27/06 137/526 |
| 4,971,093 A * | 11/1990 | Andersson | ........... | F16K 15/065 137/542 |
| 5,462,081 A | 10/1995 | Perusek et al. | | |
| 5,996,618 A * | 12/1999 | Saito | ..................... | B29C 45/234 137/542 |
| 7,850,149 B2 * | 12/2010 | Sherikar | ............... | B05B 7/0075 261/118 |
| 11,598,432 B2 * | 3/2023 | Baxter | ................. | F16K 15/065 |
| 2003/0188783 A1 * | 10/2003 | Vicars | .................... | F16K 17/04 137/541 |
| 2008/0083463 A1 * | 4/2008 | Fazekas | ............. | F24D 19/1018 137/512.1 |
| 2009/0278266 A1 * | 11/2009 | Freitas | ..................... | B05B 1/06 261/118 |
| 2013/0209298 A1 * | 8/2013 | Gaertner | ............ | F04B 53/1032 137/542 |
| 2014/0091486 A1 * | 4/2014 | Watson | .................... | B05B 1/06 261/66 |
| 2017/0030616 A1 * | 2/2017 | Takada | .................. | F16K 15/026 |
| 2019/0316696 A1 * | 10/2019 | McCormack | ............ | F16K 1/54 |

* cited by examiner

FLUID FLOW THROTTLE VALVE

CROSS-REFERENCE TO RELATED APPLICATIONS

This application is a National Phase entry of International PCT Application No. PCT/FI2022/050203, filed on Mar. 29, 2022, which claims priority to Finland Patent Application No. 20215438, filed on Apr. 13, 2021, the disclosures of which are incorporated herein by reference in their entireties.

TECHNICAL FIELD

A fluid flow throttle valve that keeps the pressure of the flow of fluid pumped into a system by a high-pressure pump constant and that is particularly suitable as a reject valve for maintaining the system pressure of a reverse osmosis device at a pressure level of <20 bar.

BACKGROUND

It is known that by throttling the flow exiting a reverse osmosis module as a reject, the pressure prevailing in the module can be adjusted while water is simultaneously fed into the module by a high-pressure pump. A module refers to a conventional, standardized tubular pressure vessel and a reverse osmosis membrane disposed therewithin. As a flow of saline water passes through the module, the membrane separates fresh water from it. The remaining concentrate from which fresh water has been separated is called the reject.

In a reverse osmosis system, the number and type of membranes determine the limits for the volume of feed flow.

The higher the concentration of solids, mainly salts, dissolved in the water (TDS=total dissolved solids), the higher the osmotic pressure of the water. In order for the membrane to separate fresh water from saline water, the pressure prevailing in the module must be at least equal to the osmotic pressure of the concentrate flowing through the module. The volume of fresh water separated by the membrane is referred to as the output. The sum of the output volume and the reject volume is equal to the feed flow volume.

If constant throttling, such as a flow restrictor hole, is used on the reject side, the problem is that the pressure in the system changes as the salinity of the water changes. The temperature of the water to be treated also has a significant effect on the output of the membranes, whereby the volume of the reject changes accordingly. Another problem with constant throttling is that the output of the membranes decreases as the membranes age, whereby the volume of the reject relative to the volume of the feed flow increases. Constant throttling is only suitable for situations where the volume of the feed flow is constant and where the output of the membranes remains constant.

In small reverse osmosis devices intended for brackish water with an output of a few tens of liters per hour, throttling the reject flow is usually done with a manually adjustable needle valve adjusted to a desired throttle level once the pressure pump of the system is started, A practical issue with these devices is that the output of the membrane only begins to stabilize after the system has been used for some time.

Particularly if a reverse osmosis system is to be operated with energy obtained from solar panels, without intermediate batteries, the need for manual adjustment of the reject valve would be constant. This is because power obtained from solar panels changes as the solar irradiance in $kW/m^2$ varies. Thereby also the rotational speed of the inverter-controlled high-pressure pump of the system varies and, as a result, the feed volume and reject volume of the system vary.

SUMMARY

The purpose of the throttle valve according to the invention is to keep the pressure of a reverse osmosis system constant regardless of variation of the feed flow and to be functionally reliable at a preset system pressure.

The valve according to the invention is spring-actuated. It comprises a cone adjusting the flow opening of the outflow channel, having its narrower end on the inflow side. As described hereinafter, the cone rises as it moves in the outflow channel in the direction of the flow, whereby the annular cross-sectional area of the outflow opening of the outflow channel also increases.

All known spring-actuated valves, such as check valve, pressure relief valve, safety valve and bypass valve, resemble each other structurally, but their operating principle and purpose of use are different.

Structurally, the throttle valve according to the invention closely resembles a check valve, but its function and purpose of use are not that of a check valve, a pressure relief valve, a throttle valve for a refrigeration machine nor that of any of the other valves mentioned above. It is a valve with a cross-sectional flow area that is adjusted steadily in accordance with variation of the flow volume and wherein the valve keeps the system pressure constant. This is not accomplished by the other valves mentioned above.

The publication JP 3079258 U describes a check valve, the structure of which closely resembles the throttle valve according to the invention. Therein, a spring presses the valve-closing cone against the wall of a conical valve seat. The cone sits deep in the valve seat and the cone has a sealing ring installed around it. The purpose of use of the valve is that when closed, it does not let any flow in from the direction opposite to the inflow. Since the cone is for the most part inside the seat, the inflow pressure tending to open the valve is exerted mainly on the end of the stem of the cone and very little on the cone itself. When the force exerted on the cone and the stem thereof by the inflow exceeds the opposing force exerted on the cone by the spring, the cone rises abruptly, thereby opening the channel. The flow pressure between the cone and the conical seat thereof then immediately drops to almost zero. This is because the flow velocity increases greatly between the walls located close together. In a valve of the type disclosed in the publication, very little of the inflow pressure is exerted on the cone itself, so when the valve opens, the spring force pulls the cone back into the seat. To prevent this from happening, the inflow volume must be high enough and the spring force small, otherwise the cone will start to beat against the seat (hunting phenomenon). The greater the spring force exerted on the cone, the worse this hunting phenomenon is. Thus, the spring is intended to be as loose as possible and to only return the cone into the seat after the flow has ceased. In practice, this type of a check valve is always maximally open or completely closed. The structure of this check valve is not suitable for keeping the inflow pressure constant as the flow volume varies.

The publication WO2014168768 describes a valve which is similar in structure to the valve according to the invention. It is intended for sudden pressure relief of internal gas pressure of a system in a subsea high-pressure environment when the pressure in the system increases for some reason. It is not intended for fluid flow or for maintaining the inflow pressure. With fluid flow, it would face the same problems as the check valve described in the above-mentioned publication.

The publication US 2017/0030616 A1 describes a valve acting as a throttle valve for a refrigeration machine, wherein refrigerating fluid pressurized by the compressor evaporates as it flows through the valve. The valve cone rests against the edge of the outflow channel. In an attempt to prevent the valve cone from getting stuck in the outflow channel, the edge of the outflow channel is provided with a small groove through which the refrigerating fluid can flow continuously. The problem with the proposed solution is that when the cone begins to rise as the volume of fluid pumped by the compressor increases, the force exerted on the cone by the pressure of the fluid flow decreases while the force exerted on the cone by the spring tending to close the valve increases. In the absence of any other forces, the valve closes abruptly, only to reopen immediately thereafter, and the cone begins to beat (hunting phenomenon) against the edge of the outflow channel. In the valve of the publication, this phenomenon is attempted to be mitigated by reducing the rise of the cone at maximum flow volume by adding an additional channel with a constant hole next to the flow channel closed by the cone. The publication notes that the proposed solution does not eliminate the hunting phenomenon at maximum flow volume. It is obvious, however, that the problem occurs at all flow volumes at which the cone begins to rise.

The throttle valve according to the invention solves the above-mentioned problem (hunting phenomenon) on the basis of the characteristic features set forth in the appended claim 1. The spring-actuated cone of the throttle valve according to the invention rises and falls in accordance with variation of the flow volume, keeping the preset system pressure constant.

The throttle valve according to the invention has an outflow channel arranged centrally inside the body and having a cross-sectional area perpendicular to the flow that is smaller than the cross-sectional flow area of the tubular body of the throttle valve. The narrower diameter end of the cone adjusting the flow opening of the outflow channel is on the inflow side. The larger diameter end of the cone has a motion restrictor supported thereto consisting of a restrictor member that is releasably supported to the stem passing through the cone and arranged perpendicular to the stem, the restrictor member having restrictor legs supported thereto, wherein the restrictor legs extend from the restrictor member to a planar surface surrounding the outflow end of the outflow channel.

The restrictor legs restrict the movement of the cone such that it is prevented from being pressed against the circumference of the end of the outflow channel by the force exerted thereon by the spring, as a result of which the cone always permits an evenly surrounding bypass flow that is permitted to flow between the restrictor legs and further through the channel between the restrictor member and the body. The volume of this bypass flow can be adjusted by adjusting the length of the restrictor legs. FIG. 2.

A support plate closely tangential to the inner surface of the body is supported to the stem of the cone on the inflow side, wherein one end of a loaded compression spring, having its opposite end supported to the body, is supported to said support plate.

The flow causes a pressure difference across the motion restrictor, which causes a force to be exerted on the restrictor member thereof in the direction of the flow, which force increases as the flow volume increases and the magnitude of which force can be adjusted by adjusting the cross-sectional area of the channel between the restrictor member and the body in the direction of the flow. The flow also causes a dynamic pressure on the restrictor member, whereby the dynamic pressure exerts an additional force on the restrictor member in the direction of the flow.

The support plate is provided with flow-permitting channels. The cross-sectional area of the channels perpendicular to the flow is arranged such that the flow causes a pressure difference of a desired magnitude across the support plate, which in turn causes a force exerted on the support plate in the direction of the flow, which force increases as the flow volume increases and contributes to counteracting the increase in the spring force tending to close the valve.

The above-mentioned forces exerted on the motion restrictor and the support plate in the direction of the flow counteract the increase in force caused by the rising cone and the decrease in the force exerted on the cone by the flow pressure. Owing to these counteracting forces, the rise height of the cone is adjusted automatically, keeping the system pressure constant, whereby no hunting phenomenon will occur.

When operated as a reject valve for a reverse osmosis system, the throttle valve according to the invention enables an electric motor of the high-pressure pump of the reverse osmosis unit to be operated directly with electricity obtained from solar panels via an inverter, whereby the rotational speed of the motor and, correspondingly, the volume of the feed flow vary in accordance with power obtained from the solar panels. As a result of the variation of the rotational speed of the motor, the volume of fresh water, and, correspondingly, the volume of the reject produced by the reverse osmosis system per unit of time vary.

BRIEF DESCRIPTION OF THE DRAWINGS

Next, the structure and operation of the throttle valve according to the invention is described in more detail with reference to FIGS. 1 to 3.

DETAILED DESCRIPTION

Figure 1:
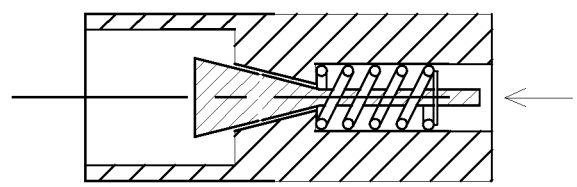
FIG. 1 shows a check valve of the prior art in which the valve cone is supported on a conical seat.
Figure 2:
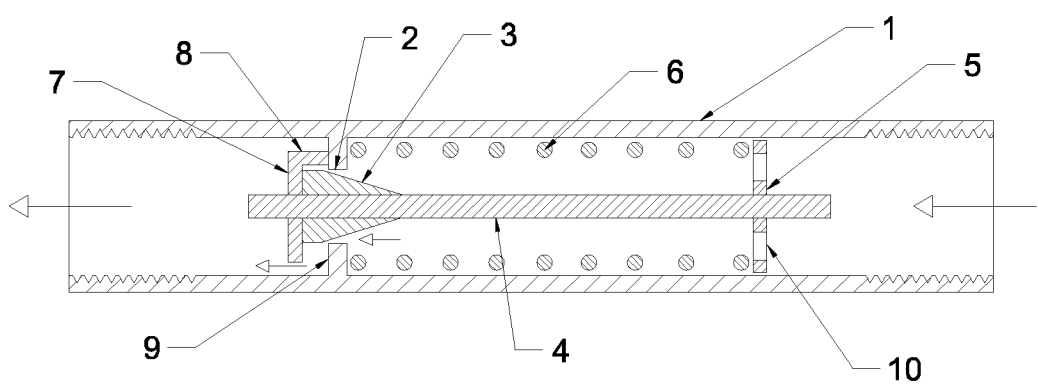
FIG. 2 shows a structure of the throttle valve according to the invention in longitudinal cross-section with the cone 3 in its lowest position.

In FIG. 2:

The throttle valve comprises a tubular body 1 where flow enters from one end thereof and wherein the body 1 is provided with an outflow channel 2 with a circular cross-section.

A cone 3 is arranged in the outflow channel 2 such that the narrower end of the cone is on the inflow side and the cone is axially supported on a stem 4 passing through the cone 3.

A support plate 5 is supported to the stem 4 on the inflow side, wherein the support plate 5 is movable along with the stem 4 and closely tangential to the inner surface of the body 1.

A loaded compression spring 6 surrounding the stem 4 is provided between the outflow channel 2 and the support plate 5, which compression spring 6 is supported to the support plate 5 from its one end and to the body 1 from its other end.

The support plate 5 is provided with one or more flow-permitting channels 10.

A motion restrictor is supported to the larger diameter end of the cone 3, the motion restrictor consisting of a restrictor member 7 releasably supported to the stem 4 passing through the cone 3, having restrictor legs 8 supported thereto extending from the restrictor member 7 to a planar surface 9 surrounding the outflow end of the outflow channel 2.

A flow-permitting channel 11 is formed between the restrictor member 7 and the body 1.

The restrictor legs 8 restrict the motion of the cone 3 such that it is prevented from being pressed against the circumference of the end of the outflow channel 2 by the force exerted thereon by the spring 6. Owing to the restrictor legs 8, the cone 3 always permits an evenly surrounding bypass flow when the cone 3 is in its lowest position, whereby the flow can pass between the restrictor legs 8 and further through the channel 11. The volume of the bypass flow can be adjusted by adjusting the length of the restrictor legs 8.

Figure 3:
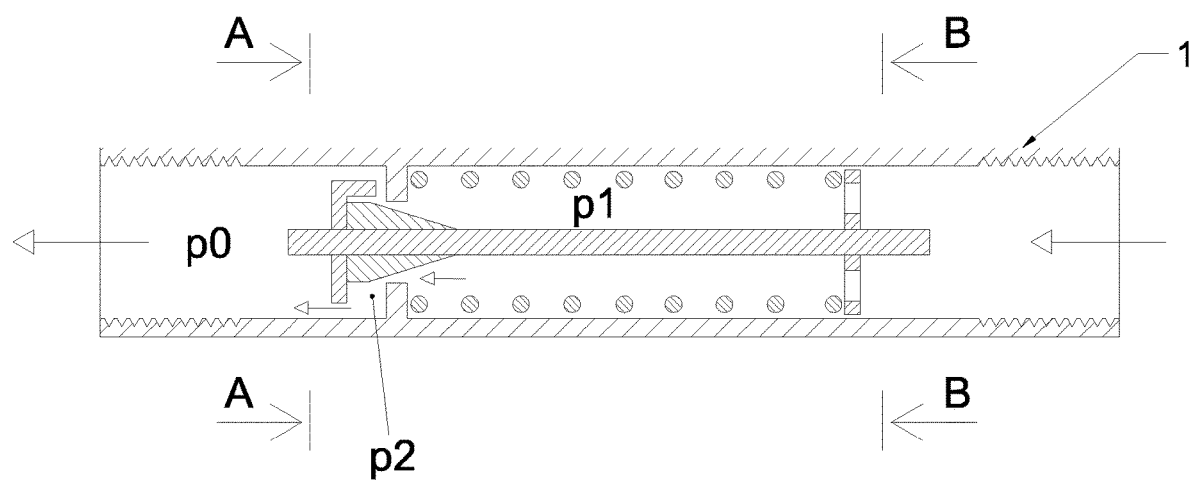
FIG. 3 shows the operation of the valve according to the invention.
Figure 3:
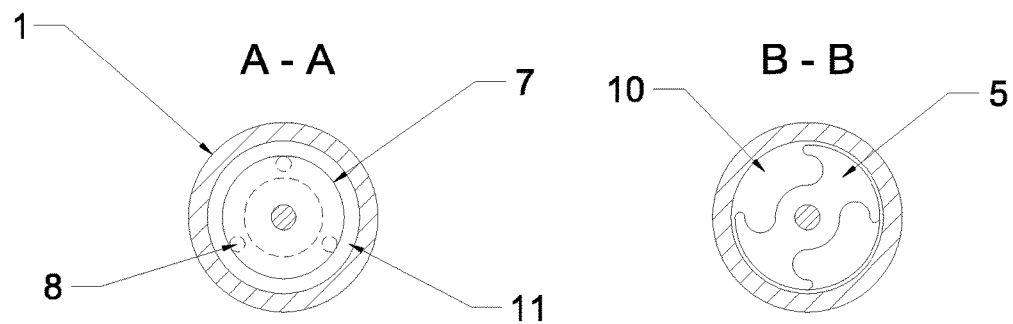

In FIG. 3:

The pressure generated by the throttle valve is p1.

The pressure between the outflow end of the outflow channel 2 and the restrictor member 7 is p2. The pressure difference across the outflow channel 2 is (p1−p2).

The pressure difference across the restrictor member 7 is (p2−p0) and it as well as the magnitude of the force exerted by it on the restrictor member 7 can be adjusted by adjusting the size of the cross-sectional area of the restrictor member 7 perpendicular to the flow.

The magnitude of the force exerted on the support plate 5 by the flow can be adjusted by adjusting the cross-sectional area of the channel 10 perpendicular to the flow.

The flow pressure in the outflow channel 2 converts primarily to velocity (Bernoulli's principle). The flow velocity at the end of the outflow channel 2 is obtained from the equation $v = C_D (2gH)^{1/2}$. The pressure head H corresponds to the pressure difference across the channel throttling the flow.

The volume of the through-flow of the outflow channel 2 is obtained approximately from the formula $Q = C_0 \cdot A \cdot (2g \cdot H)^{1/2}$, where Q is [m³/s]; $C_0$ a constant depending on the shape of the channel; A [m²] is the cross-sectional area of the channel; g is 9.81 m/s², and H [m] is the pressure head, i.e. the pressure difference (p1−p2) across the outflow channel 2.

The same formula is also used to obtain the flow pressure difference across the restrictor member 7 and the support plate 5.

Next, an exemplary embodiment of the valve according to the invention is described.

The problem solved in the exemplary embodiment:

In a case where the cone 3 closes the outflow channel 2 completely, the pressure generated by the high-pressure pump exerts a force on the cone 3 tending to open the valve. In order for the cone 3 to start rising only when the target pressure of the system has been reached, the preloaded spring 6 must cause a counterforce of equal magnitude. When the valve opens, the cross-sectional area of the cone 3 onto which the flow pressure is exerted decreases while the force generated by the spring 6 tending to close the valve increases. In the absence of other forces acting on the cone 3, the valve closes abruptly only to reopen immediately thereafter (hunting phenomenon).

The solution:

The forces parallel to the direction of the flow exerted on the restrictor member 7 and, where needed, on the support plate 5 of the throttle valve of the invention counteract the relative increase in the force tending to close the valve.

In this exemplary embodiment, the volume pumped by the high-pressure pump ranges between 5 and 8 m³/h.

The target pressure of the system is from 10.5 to 11 bar. The flow continues from the throttle valve to an ambient pressure of 0 barg.

The dimensions of the throttle valve:

The inner diameter of the body 1 is 30 mm

The outflow channel 2 has a diameter of 16 mm and a cross-sectional area of 2 cm²

The cone angle of the cone 3 is 34 degrees

The compression spring 6 has a free length of 185 mm, a wire thickness of 3.76 mm, a spring constant of 3.55 N/mm The cross-sectional area of the restrictor member 7 perpendicular to the flow is 3.7 cm²

The cross-sectional area of the channel 11 between the restrictor member 7 and the body 1 is 1.5 cm²

The length of the restrictor legs 8 of the motion restrictor is defined such that when the cone 3 is in its lowest position and p1−p2=10 bar, a flow of m³/h can flow past the cone 3, FIG. 2. In this case, the cross-sectional area of the cone 3 at the outflow end of the outflow channel 2 is 1.7 cm², and, correspondingly, the cross-sectional area of the annular flow opening permitting flow past the cone 3 is 0.3 cm². The flow exerts a force of 170 N on the cone 3 in the direction of the flow. The pressure difference across the restrictor member 7 (p2−p0=0.4 bar) exerts a force of 15N on the restrictor member 7. In order for the cone 3 to remain in place, the force generated by the spring 6 must be equal to the sum of the above-mentioned forces, i.e. 185N, which means that the spring 6 is preloaded to a length of 133 mm. The inflow side end of the stem 4 of the cone 3 is subjected to the same pressure as the cone 3, thus the cross-section of the cone 3 at the outflow end of the outflow channel 2 has been used in the calculations.

At a volume of 5.5 m³/h, i.e. immediately after the valve has opened, the cross-sectional area 2 of the cone 3 at the outflow end is 1.67 cm², in which case it is subjected to a force of 167 N generated by the flow pressure. The pressure difference across the restrictor member 7 is 0.5 bar, thus, the restrictor member 7 is subjected to a force of 19N. The spring 3 has been compressed by a further 0.25 mm, so the force generated by it has increased by 1 N, i.e. to 186N. Since 167 N+19 N=186 N, the valve remains open, particularly since the restrictor member 7 is additionally subjected to the dynamic pressure of the flow.

At a maximum volume of 8 m³/h and a pressure difference of 10 bar across the outflow channel 2, the cone 3 has risen by 1.5 mm and the cross-sectional area of the annular flow opening surrounding it has increased to 0.5 cm². The cross-sectional area of the cone 3 at the outflow end of the outflow channel 2 has correspondingly decreased to 1.50 cm², whereby the force generated by the flow pressure and exerted on the cone 3 is 150 N. The force generated by the spring 3 has increased by 5 N, i.e. to 189 N.

A flow of 8 m³/h causes a pressure difference of more than 1.1 bar across the restrictor member 7 of the motion restrictor. In this case, the force exerted on the restrictor member 7 by the flow is 41 N. Since 150 N+41 N>189 N, the valve does not close, particularly since the restrictor member 7 is also subjected to the dynamic pressure of the flow, causing an additional force parallel to the direction of the flow.

Since at a flow volume of 8 m³/h, the pressure difference across the restrictor member is 1.1 bar, the pressure on the inflow side of the outflow channel 2 must be 11.1 bar in order for the pressure difference across the outflow channel 2 to be 10 bar.

The size of the channel 10 in the support plate 5 may be used to influence the pressure difference across the support plate 5. Since the support plate 5 is supported on the stem 4 of the cone 3, the magnitude of the force exerted on the support plate 5 in the direction of the flow can be used to counteract the force exerted on the cone 3 by the spring 6, if necessary.

As a result of the above-mentioned forces, the cone 3 automatically enters the equilibrium state at different flow volumes and the throttle valve according to the invention keeps the system pressure at the desired level.

The invention claimed is:

1. A fluid flow throttle valve that keeps the pressure of a fluid flow pumped into a system by a high-pressure pump constant and that is particularly suitable as a reject valve for maintaining the system pressure of a reverse osmosis device at a pressure level of <20 bar, wherein the valve comprises a tubular body, where flow enters from one end thereof, and the body is provided with a central outflow channel with a circular cross-section, having a cone arranged therein with its narrower end on the inflow side and being axially supported on a stem to which a support plate movable along with the stem is supported on the inflow side, wherein the outer edge of the support plate is closely tangential to the inner surface of the body and wherein the support plate is provided with channels for flow therethrough, and wherein a loaded compression spring surrounding the stem is provided between the outflow channel and the support plate, the compression spring being supported to the support plate from its one end and to the body from its other end, wherein a motion restrictor is supported to the larger diameter end of the cone, the motion restrictor consisting of a restrictor member and restrictor legs supported to the restrictor member and extending from the restrictor member to a planar surface surrounding the outflow end of the outflow channel, wherein the restrictor legs are adapted to restrict the motion of the cone such that the cone is prevented from being pressed against the circumference of the outflow end of the outflow channel by the force generated by the spring, as a result of which the cone always permits an evenly surrounding bypass flow permitted to flow between the restrictor legs and further through a flow-permitting channel between the restrictor member and the body.

2. The valve according to claim 1, wherein the position of the support plate on the stem is adjustable in the axial direction of the stem.

3. The valve according to claim 1, wherein the stem passes through the cone and the restrictor member is releasably supported to the stem.

* * * * *